June 15, 1948. U. C. HAREN 2,443,386
APPARATUS FOR MOLDING STRIP MATERIAL
Filed Nov. 23, 1945 2 Sheets-Sheet 1
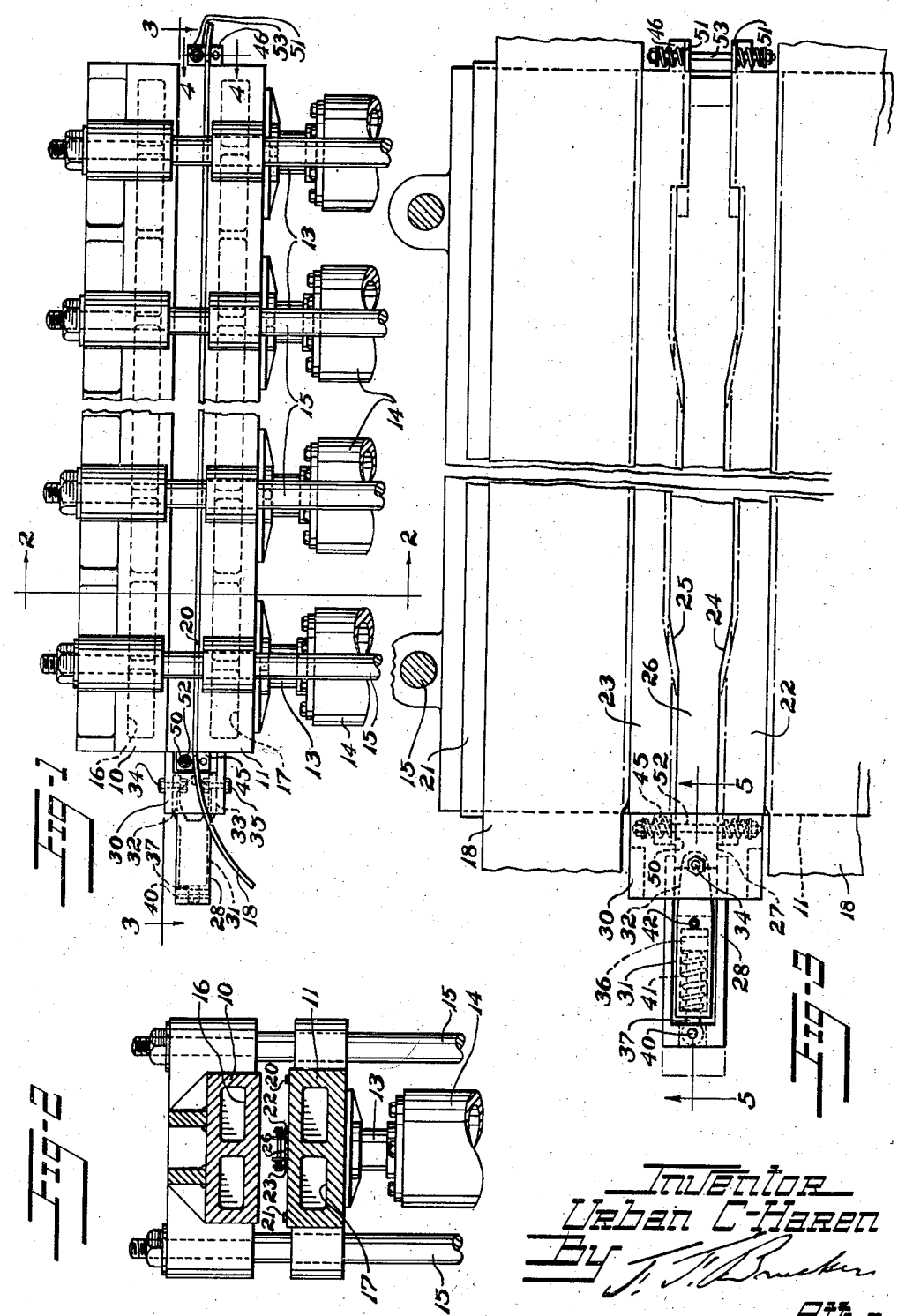

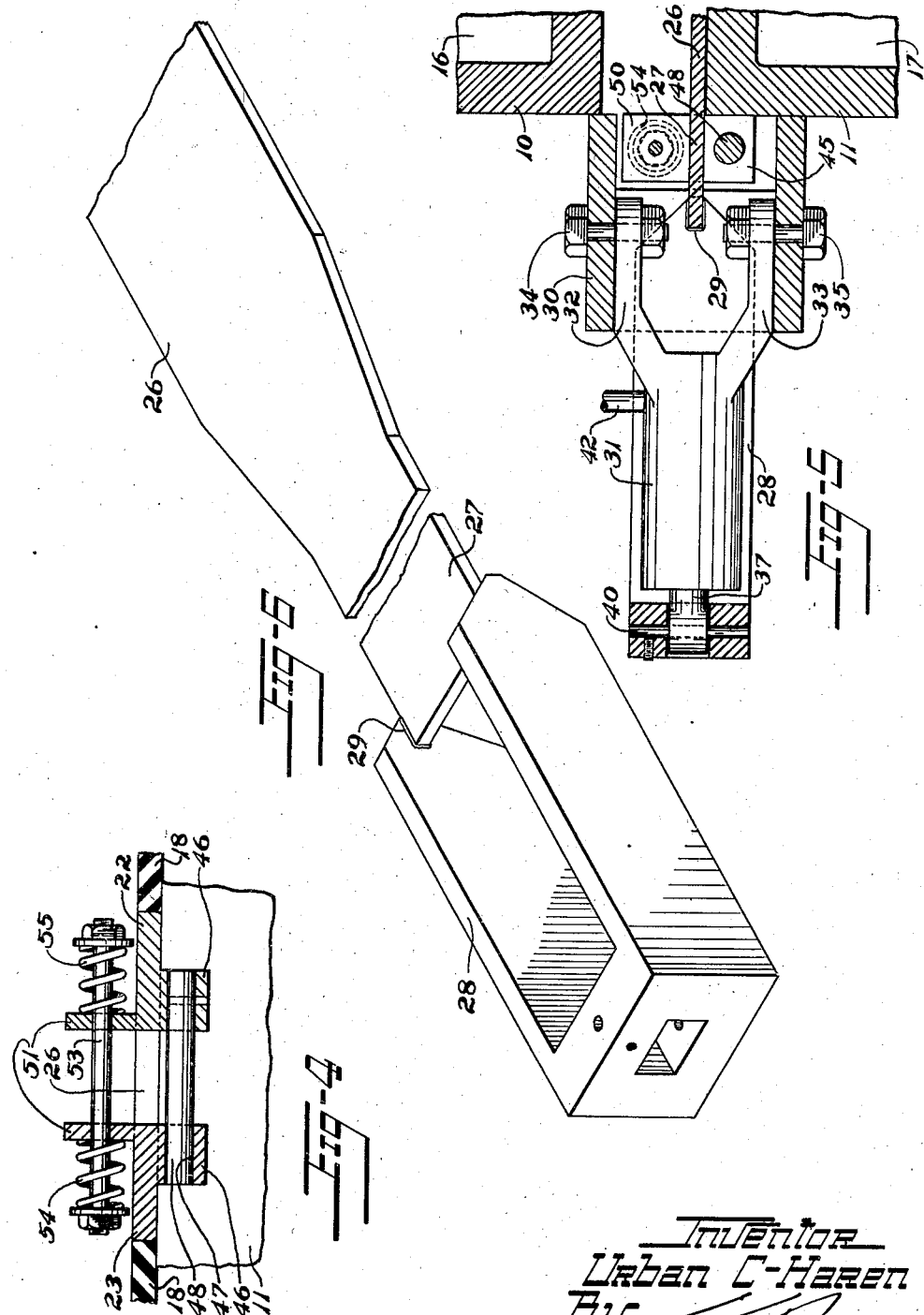

Patented June 15, 1948

2,443,386

UNITED STATES PATENT OFFICE 2,443,386

APPARATUS FOR MOLDING STRIP MATERIAL

Urban C. Haren, Akron, Ohio, assignor to The B. F. Goodrich Company, New York, N. Y., a corporation of New York Application November 23, 1945, Serial No. 630,499

4 Claims. (Cl. 18—17)

This invention relates to apparatus for use in molding strip sheet material and is especially useful in molding transmission belts, although the invention is also useful in molding other sheet material.

Heretofore in the molding of flat transmission belts, difficulty has been experienced in providing confining pressure to the edges of the belt such as to mold the belt with a square edge.

Objects of the invention are to provide for applying pressure to the edge of the belt while it is confined in a press, to provide for simultaneously molding a plurality of belts, to provide quick release of pressure, and to facilitate change to different sizes of belts.

These and other objects will appear from the following description and the accompanying drawings.

Of the drawings,

Fig. 1 is a side elevation of a belt press provided with a gauge made in accordance with and embodying the invention, parts being broken away.

Fig. 2 is a section thereof taken on line 2—2 of Fig. 1.

Fig. 3 is a horizontal section thereof, taken on line 3—3 of Fig. 1.

Fig. 4 is a section of the gauge, taken on line 4—4 of Fig. 1 showing parts of the belts and the press platen, other parts being broken away.

Fig. 5 is a sectional view taken on line 5—5 of Fig. 3.

Fig. 6 is a perspective view of the end of the wedge member, parts being broken away.

Referring to the drawings, the numeral 10 designates the upper fixed platen, and the numeral 11 the lower movable platen of a hydraulic press such as is used for vulcanizing belting or other sheet material. The lower platen is supported by a plurality of rams 13 actuated by hydraulic cylinders 14. Strain rods 15 connect the cylinders to the upper platen 10 and act also as guides for the movable lower platen. The upper and lower platens are chambered, as at 16, 17, respectively, for circulation of steam or other heated fluid for providing vulcanizing heat. Sheet material 18 is usually vulcanized by passing it between the separated platens and closing the platens thereagainst step by step, the material being clamped between the platens at each step a sufficient time to accomplish vulcanization. For gauging the thickness of the vulcanized material and molding its margins, strips 20, 21 of metal are placed at the margins of the material and limit closing of the press.

To provide for vulcanizing a plurality of strips of belting or other sheet material arranged side by side in a single press, and to provide for pressing the intermediate contiguous edge of the belts, I provide a pair of movable gauge strips 22, 23 between the platens and resting upon the lower platen. The gauge strips 22, 23 have stepped inclined edge faces 24, 25 facing each other for engaging complemental stepped inclined edge faces of an adjustable wedge member 26 located therebetween. The arrangement is such that when the wedge member is moved lengthwise of the gauge strips in one direction, or toward the left as seen in Fig. 3, the gauge strips are forced apart laterally of the press, and when the wedge member is moved in the opposite direction, pressure of the gauge strips laterally against the margins of the belt strip is released. The belt material is laterally confined during vulcanizing between the gauge strips 20, 21 fixed to the lower platen and the movable gauge strips 22, 23 and its edges are molded to correspond to the gauge strips.

To provide mechanism independent of the press and freely removable therefrom for operating the wedge member 26, the narrowed end 27 of the wedge member is secured at its sides to the limbs of a U-shaped stirrup member 28, as by welding 29. A box or reaction member 30 surrounds the stirrup member but does not have contact therewith. One open end of the box member rests against the end faces of the platens 10, 11 but is not secured thereto. A pressure fluid cylinder 31 has ears 32, 33 at its closed end which are secured to the upper and lower sides of the box member 30, as by bolts 34, 35. A piston 36 fitted to slide in the cylinder is fixed to a piston rod 37 which in turn is secured to the stirrup 28 by a pin 40. A compression coil spring 41 is located about the piston rod within the cylinder between the piston 36 and the rod end of the cylinder. A pipe 42 connects the cylinder to a convenient source of hydraulic pressure fluid or to an exhaust outlet by way of a three-way control valve (not shown) whereby fluid may be admitted to the cylinder to advance the piston to the left of Figs. 1, 3, and 5 thereby moving the stirrup 28 and the wedge member 26 in the same direction, reaction of the cylinder being against the ends of the platens 10, 11. Upon release of pressure in the cylinder, as by opening the cylinder through the control valve to exhaust the cylinder, the coil spring returns the piston toward the right of Figs. 1, 3 and 5 and moves the stirrup and the wedge member in the opposite direction.

For removably retaining the fences 22, 23 in proper alignment and holding them in contact with the wedge member, the fences are provided at their ends beyond the press platens with depending lugs 45, 46 each adapted to engage over an end face of the lower platen. Dowel holes 47 are formed in the lugs of one fence, and dowel pins 48 are fixed to the lugs of the opposite fence for entering the dowel holes and holding the fences in proper alignment. The fences are also formed at their ends beyond the press platens with upstanding apertured ears 50, 51 through which bolts 52, 53 extend. Compression coil springs 54, 55 are positioned on each bolt between an end of the bolt and a fence. The arrangement is such that the springs force the fences toward each other against the wedge member, while the entire apparatus may be removed from the press when the press is open.

The operation of the apparatus is as follows:

With the lower platen of the press lowered and the pipe 42 opened through the control valve to exhaust the cylinder 31, the wedge member 26 will be in the full line position as shown in Fig. 3 and strips of belting material may be advanced between the platens and between each stationary fence 20, 21 and its opposing moveable fence 22, 23. The platen 11 is then raised under hydraulic pressure to clamp the strip material lightly. Then hydraulic fluid under pressure is admitted through the pipe 42 to cylinder 31 causing the piston 36 to advance, compressing the spring 41 and advancing the wedge member 26 to the left in Fig. 3 to the dot-and-dash position thereby applying pressure to the fences 22, 23 and moving them outwardly against the strip material. The hydraulic pressure applied to close the press is then increased during vulcanization of the strips. When the strips have been vulcanized, the pipe 41 is opened to exhaust and the press platen 11 is lowered. As the hydraulic pressure is released against piston 36, coil spring 41 moves the wedge member 26 to the right in Fig. 3 and the springs 54, 55 force the fences 22, 23 toward each other releasing pressure laterally against the strips of vulcanized material.

Variations may be made without departing from the scope of the invention as it is defined by the following claims.

I claim:

1. Apparatus for laterally confining and pressing strip material in a space between the molding platens of a press, said apparatus comprising a fence insertable in a space between press platens, said fence having retaining means to extend beyond the ends of a platen for engaging over the ends of the platen, a wedge member supported by said platen adjacent said fence and movable therealong for adjusting said fence across the platens, and power-operated means having a reaction member engaging said platen at an end thereof for moving said wedge member along said fence, said apparatus being insertable and removable as a unit when said press is opened.

2. Apparatus for laterally confining and pressing strip material in a space between the molding platens of a press, said apparatus comprising a fence insertable in a space between the platens, said fence having retaining means extending beyond the ends of a platen for engaging over the ends of the platen, a wedge member supported by said platen adjacent said fence and movable therealong for adjusting said fence across the faces of the platens, power-operated means having a reaction member engaging said platen at an end thereof for moving said wedge member along said fence, and spring means opposing movement of said fence by said wedge member, said apparatus being insertable and removable as a unit when said press is opened.

3. Apparatus for laterally confining and pressing strip material in a space between the molding platens of a press, said apparatus comprising a pair of fences insertable in a space between the platens, said fences having retaining means to extend beyond the ends of a platen for engaging over the ends of one of the platens, a wedge member supported by said platen between said fences and movable therealong for adjusting said fences with relation to each other across the platens, and power-operated means having a reaction member engaging said platen at an end thereof for moving said wedge member along said fences, said apparatus being insertable and removable as a unit when said press is opened.

4. Apparatus for laterally confining and pressing strip material in a space between the molding platens of a press, said apparatus comprising a pair of fences insertable in a space between the platens, said fences having retaining means to extend beyond the ends of a platen for engaging over the ends of a platen, a wedge member supported by said platen between said fences and movable therealong for adjusting said fences with relation to each other across the platens, power-operated means having a reaction member engaging said platen at an end thereof for moving said wedge member along said fences, and spring means opposing movement of said fences by said wedge member, said apparatus being insertable and removable as a unit when said press is opened.

URBAN C. HAREN.

REFERENCES CITED

The following references are of record in the file of this patent:

UNITED STATES PATENTS

| Number | Name | Date |
|---|---|---|
| 1,708,178 | Hottel | Apr. 9, 1929 |
| 2,342,769 | Suchann | Feb. 29, 1944 |

FOREIGN PATENTS

| Number | Country | Date |
|---|---|---|
| 510,838 | Germany | Oct. 23, 1930 |